Figure 1:
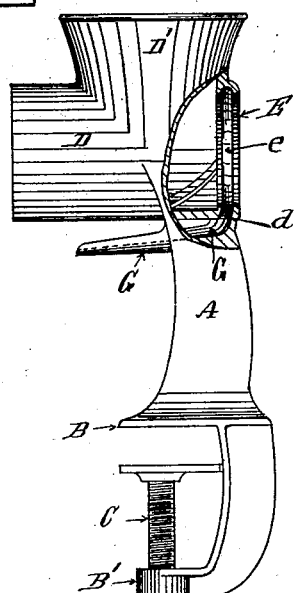

No. 727,130. PATENTED MAY 5, 1903.
M. GRISWOLD, Jr.
FOOD CHOPPER.
APPLICATION FILED JUNE 26, 1902.
NO MODEL.

Witnesses.

Inventor.
Matthew Griswold Jr.
By his Atty.

No. 727,130. Patented May 5, 1903.

UNITED STATES PATENT OFFICE.

MATTHEW GRISWOLD, JR., OF ERIE, PENNSYLVANIA.

FOOD-CHOPPER.

SPECIFICATION forming part of Letters Patent No. 727,130, dated May 5, 1903.

Application filed June 26, 1902. Serial No. 113,321. (No model.)

*To all whom it may concern:*

Be it known that I, MATTHEW GRISWOLD, Jr., a citizen of the United States, residing at Erie, in the county of Erie and State of Pennsylvania, have invented certain new and useful Improvements in Food-Choppers; and I do hereby declare the following to be a full, clear, and exact description of the invention, such as will enable others skilled in the art to which it appertains to make and use the same, reference being had to the accompanying drawings, and to the letters of reference marked thereon, forming part of this specification.
My invention relates to improvements in food-choppers, which consist substantially of a frame supporting and embodying a tubular shell having a hopper on the rear end and cutting-surfaces on its front end, in which shell a forcing-screw operates to force the material placed in the hopper through the tubular shell and against the cutting-surfaces in the front or cutter end thereof and operates to cut or chop the material as it passes said cutting-surfaces.

As food-choppers are now constructed the rear or crank end of the shell is provided with a cylindrical opening the full size of the forcing-screw, which operates as a bearing for a collar or journal on the rear or crank end of the forcing-screw and also allows of the insertion or withdrawal of the forcing-screw therethrough. As food-choppers are ordinarily constructed the juices of the material being chopped constantly leak through this rear or crank end opening during the operation of the chopper and drip down upon the chopper-frame. This difficulty is overcome in one chopper by extending a trough or spout through the chopper-frame under the rear or crank end of the shell, so as to catch this drip therefrom. I have, however, overcome this difficulty by cutting a groove in the bearing in which the collar or journal on the crank end of the forcing-screw operates or in both the bearing and collar and making an opening in the lower part of the groove which leads down through the shell into a trough or spout in the frame under said bearing, which trough or groove catches the juices, which pass therefrom through the opening in the bottom of the groove into the trough or spout, which conveys them away, and thus I prevent any portion of the juices escaping from the crank end of the shell.

This invention is hereinafter fully set forth and described, and illustrated in the accompanying drawings, in which—

Figure 2:
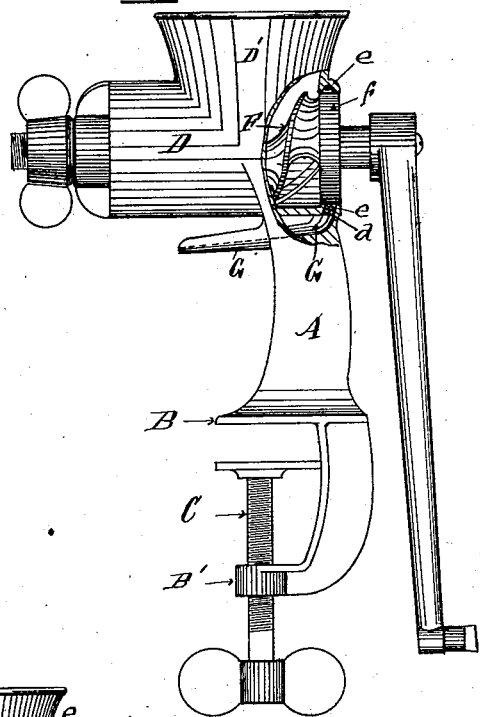
Figure 3:
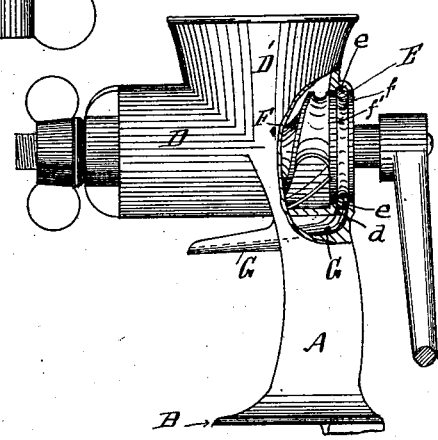

Figure 1 is a side view in elevation, with parts broken away, of a food-chopper frame embodying my invention. Fig. 2 is a like view of a food-chopper embodying my invention with the forcing-screw therein. Fig. 3 is a like view of a food-chopper embodying a modified form of my invention.

In the drawings illustrating my invention, A is the upright portion of a food-chopper frame and is provided at its lower end with clamping-jaws B B' and a clamping-screw C. On the top of the upright part A there is a cylindrical shell D, having a hopper D' on the rear end thereof. In the rear end of the shell D there is an opening E large enough to permit the insertion and removal of a forcing-screw F therethrough. This opening E operates as the bearing for the collar $f$ on the crank end of the forcing-screw F. In this bearing E, I make an annular groove $e$, and from the bottom of the groove $e$ I make a hole or opening $d$ through the bottom of the shell D, which operates to drain any fluids passing into the groove $e$ down therethrough.

In the part A of the frame directly under the opening $d$ in the shell I make a trough or spout G, which extends forward toward the cutter end of the shell D, which spout receives the drainage from the opening $d$ and carries it into a suitable receptacle. (Not shown.)

In Fig. 3 I show a modified form of construction of my invention, in which the opening or bearing E in the shell, the groove $e$ in the bearing, the opening $d$ therefrom, and the trough or spout G are the same as hereinbefore described; but in this case I make an annular groove $f'$ in the collar $f$ of the forcing-screw F, which when the forcing-screw F is in place in the shell D coincides with the groove $e$ in the opening or bearing E therein.

Having thus described my invention, so as to enable others to construct and use the same, what I claim as new, and desire to secure by Letters Patent of the United States, is—

The combination in a food-chopper of a shell having an annular groove in the crank-end opening thereof and a hole through said shell from the bottom of said groove, and a trough or spout in the frame under said shell communicating with said opening and extending toward the cutter end of the shell, substantially as and for the purpose set forth.

In testimony whereof I affix my signature in presence of two witnesses.

MATTHEW GRISWOLD, Jr.

Witnesses:
H. M. STURGEON,
F. J. BASSETT.